(12) United States Patent
Boucourt et al.

(10) Patent No.: US 10,819,955 B2
(45) Date of Patent: Oct. 27, 2020

(54) AIRCRAFT PROVIDED WITH A SURVEILLANCE SYSTEM

(71) Applicant: LATECOERE, Toulouse (FR)

(72) Inventors: Gerard Boucourt, Rouffiac Tolosan (FR); Xavier Carrier, Rouffiac Tolosan (FR); Laurent Groux, Mons (FR)

(73) Assignee: LATECOERE, Toulouse (FR)

( * ) Notice: Subject to any disclaimer, the term of this patent is extended or adjusted under 35 U.S.C. 154(b) by 651 days.

(21) Appl. No.: 15/463,892

(22) Filed: Mar. 20, 2017

(65) Prior Publication Data

US 2017/0195634 A1   Jul. 6, 2017

Related U.S. Application Data

(63) Continuation-in-part of application No. 14/009,170, filed as application No. PCT/EP2012/055988 on Apr. 2, 2012, now abandoned.

(30) Foreign Application Priority Data

Apr. 1, 2011   (FR) ...................... 11 52832

(51) Int. Cl.
*H04N 7/18* (2006.01)
*H04N 5/232* (2006.01)
(Continued)

(52) U.S. Cl.
CPC ............. *H04N 7/181* (2013.01); *G02B 13/06* (2013.01); *G03B 11/045* (2013.01);
(Continued)

(58) Field of Classification Search
CPC ........ B64D 2045/0035; B64D 45/0015; B64D 47/08; H04N 5/23238; H04N 7/183
See application file for complete search history.

(56) References Cited

U.S. PATENT DOCUMENTS

| 4,831,438 A | 5/1989 | Bellman, Jr. et al. |
| 5,426,476 A | 6/1995 | Fussell et al. |

(Continued)

FOREIGN PATENT DOCUMENTS

| EP | 1419964 | 5/2004 |
| FR | 2856226 | 12/2004 |

(Continued)

OTHER PUBLICATIONS

International Search Report, dated Jul. 5, 2012, from corresponding PCT application.

*Primary Examiner* — Gelek W Topgyal
(74) *Attorney, Agent, or Firm* — Nixon & Vanderhye

(57) ABSTRACT

An aircraft (11) includes an enclosure and a system for surveilling areas of interest inside the enclosure. The enclosure includes a transverse aisle (13) and a longitudinal aisle (15) that intersect at an intersection zone (19), a first access door (14) being located at one end of the transverse aisle (13) and a second access door (22) being located at one end of the longitudinal aisle. In addition, the surveillance system includes a panoramic camera (17) with a panoramic field of view, the camera being positioned at the intersection zone (19) such that an area of interest associated with the first access door (14) and an area of interest associated with the second access door is located within the field of view of the panoramic camera.

16 Claims, 2 Drawing Sheets

(51) Int. Cl.
  *H04N 5/225* (2006.01)
  *G03B 15/00* (2006.01)
  *G02B 13/06* (2006.01)
  *G03B 37/00* (2006.01)
  *G03B 15/03* (2006.01)
  *G03B 11/04* (2006.01)

(52) U.S. Cl.
  CPC .......... *G03B 15/006* (2013.01); *G03B 15/03* (2013.01); *G03B 37/00* (2013.01); *H04N 5/2252* (2013.01); *H04N 5/2256* (2013.01); *H04N 5/2257* (2013.01); *H04N 5/23238* (2013.01); *G03B 2215/0503* (2013.01)

(56) References Cited

U.S. PATENT DOCUMENTS

| | | |
|---|---|---|
| 6,831,680 B1 | 12/2004 | Kumler |
| 6,864,805 B1 | 3/2005 | Gomez |
| 7,014,148 B2 | 3/2006 | Dominguez |
| 2002/0148947 A1 * | 10/2002 | Kakiuchi ............... G03B 15/03 250/208.1 |
| 2003/0052227 A1 | 3/2003 | Pittman |
| 2005/0069207 A1 | 3/2005 | Zakrzewski et al. |
| 2005/0258943 A1 | 11/2005 | Mian et al. |
| 2006/0159164 A1 | 7/2006 | Finizio et al. |
| 2006/0169840 A1 | 8/2006 | French et al. |
| 2006/0176649 A1 | 8/2006 | Griffin et al. |
| 2007/0057785 A1 | 3/2007 | Lee |
| 2007/0124042 A1 | 5/2007 | Monroe |
| 2007/0252038 A1 | 11/2007 | Santiago Alvarez |
| 2010/0253781 A1 | 10/2010 | Sasson et al. |
| 2011/0069958 A1 | 3/2011 | Haas et al. |
| 2012/0086022 A1 * | 4/2012 | Veerasamy ............. H01L 33/22 257/88 |
| 2013/0068890 A1 | 3/2013 | Boren |
| 2013/0292513 A1 | 11/2013 | Guering |

FOREIGN PATENT DOCUMENTS

| | | |
|---|---|---|
| FR | 2904506 | 2/2008 |
| WO | 01/99429 | 12/2001 |

* cited by examiner

AIRCRAFT PROVIDED WITH A SURVEILLANCE SYSTEM

TECHNICAL FIELD

The present invention relates to an aircraft provided with a surveillance system for the surveillance of a plurality of zones of interest inside a closed space of the aircraft.

The invention finds a particularly advantageous application in the case of an aircraft of the airplane type, but is applicable to any type of aircraft. The invention finds itself to be entirely advantageous notably for application to the surveillance of access doors to an airplane closed space, including the doors situated near the flightdeck of the airplane, such as for example a door separating the flightdeck from the rest of the airplane.

PRIOR ART

Following the attacks of Sep. 11, 2001 the wording of aeronautical regulations were actually modified in order to enhance security on airplanes, particularly airplanes intended to carry passengers. One of the requirements of these regulations is the installation of a surveillance system that allows the flight crew to monitor particularly people wishing to enter the flightdeck, before admitting them.

Such a surveillance system has therefore to be able to observe a zone of interest associated with a door providing access to the flightdeck, separating said flightdeck from a cabin of the airplane, which is itself generally intended to accommodate passengers.

In the surveillance systems proposed by the prior art for this purpose a first camera is positioned in such a way that the zone of interest associated with the door providing access to the flightdeck is in the field of view of said camera.

The zone of interest associated with the door providing access to the flightdeck corresponds to a zone situated in front of said access door, outside the flightdeck. The first camera is, for example, situated just above the flightdeck access door or opposite said access door and facing toward it.

Furthermore, it is beneficial for a second access door, allowing the airplane cabin to be entered from outside, also to be under surveillance in order to provide members of the flight crew with visual information regarding the movement of passengers or equipment. The surveillance systems conventionally employed comprise for this purpose a second camera positioned in such a way that a zone of interest associated with said second access door is in its field of view.

In practice, a conventional commercial airplane comprises:
 a lateral access door separating the inside of the airplane cabin from the outside, said lateral access door opening onto a transverse aisle of the cabin, and
 a door providing access to the flightdeck, opening onto a longitudinal aisle of the cabin, which intersects with the transverse aisle at an intersection zone.

The zone of interest associated with the lateral access door of the airplane corresponds to a zone situated in front of said lateral access door, inside the cabin. The second camera is, for example, situated just over this lateral access door, or opposite it and at an opposite end of the transverse aisle.

Furthermore, the conventional surveillance systems usually comprise a third camera situated at the opposite end of the transverse aisle to the second camera. This third camera is directed toward the transverse aisle and is used to observe those portions of the transverse aisle that cannot be seen by the other cameras and/or to observe an additional lateral access door likewise opening onto the transverse aisle, for example an emergency exit of the airplane.

Such surveillance systems make it possible to provide what is generally a satisfactory view of the part of the cabin near the flightdeck. However, such surveillance systems are complicated to install in an airplane and require a great deal of wiring in order to link up all the cameras of the surveillance system, and a great deal of maintenance operations on the various elements of said surveillance system.

SUMMARY OF THE INVENTION

The invention seeks to provide a surveillance system that provides an improved view of the interior of an aircraft. The invention also seeks to offer a surveillance system which has the advantage, in certain embodiments, of being simpler to install than the surveillance systems of the prior art, while at the same time allowing numerous zones of interest to be observed.

To this end, the present invention proposes an aircraft comprising a closed space and a system for the surveillance of zones of interest within the closed space. As defined in the present invention, a closed space may be a flightdeck of the aircraft, a passenger cabin, a hold, a landing gear bay, etc. Further, a zone of interest may be associated with a door providing access to the closed space, in which case it is said access door and/or a zone in the immediate vicinity of this door. A zone of interest may also correspond to an aisle of the aircraft, to a galley (a zone in which the cabin crew prepare and store food products), etc.

Furthermore, the surveillance system comprises a camera that has a panoramic field of view and is referred to as a "panoramic camera". Throughout the present description, a panoramic camera means a camera that has a field of view with an angular width in excess of 150°. In preferred embodiments, the panoramic camera advantageously has a very wide field of view, with an angular width in excess of 240°.

The panoramic camera is sited in such a way that at least one zone of interest is in its field of view. Thus, because it is panoramic, the panoramic camera will make it possible to have a wide view of this zone of interest. Further, the panoramic camera may also be sited in such a way that at least two different zones of interest of the closed space are in its field of view. The surveillance system thus allows the surveillance of several zones of interest using just one camera.

According to a particularly preferred embodiment of the invention, the closed space comprises at least two distant, which means non-adjacent, access doors and the panoramic camera is sited in such a way that at least two zones of interest associated with different access doors are in its field of view.

The wide field of view of the camera advantageously allows the surveillance system to have practically no more dead corners, i.e. allows it to be able, for each access door concerned, to observe a very wide zone of interest, thus greatly reducing the volume of the zones in which an individual could conceal himself, near the door, without being visible to the panoramic camera according to the invention.

For preference, the closed space is the passenger cabin of the aircraft, a first access door, referred to as a lateral door, is a door providing access to the passenger cabin from outside the aircraft, and a second access door is a door providing access from the cabin to the flightdeck. The camera is located in the passenger cabin, preferably near the flightdeck.

According to one preferred embodiment of the invention, the aircraft comprises, in the passenger cabin, a transverse aisle adjacent to the flightdeck, and a longitudinal aisle which intersect one another at an intersection zone. A first access door is situated at one end of the transverse aisle and a second access door, providing access to the flightdeck, is situated at one end of the longitudinal aisle. The panoramic camera is sited at the intersection zone so that a zone of interest associated with the first access door and a zone of interest associated with the second access door are in its field of view. This topological location of the panoramic camera allows the surveillance system to cover the zones of interest which are associated with the two access doors and, in particular, a zone of interest associated with the second access door that provides access to the flightdeck. This topological location of the panoramic camera is therefore advantageous for creating a flightdeck or cockpit door surveillance system (CDSS).

According to a preferred embodiment of the invention, the surveillance system further comprises a camera that has a non-panoramic field of view (which means to say a field of view of an angular width equal to or less than 150°), referred to as a "non-panoramic camera" which is distant from the panoramic camera and sited in such a way as to observe a zone of interest that is in the field of view of the panoramic camera.

The non-panoramic camera makes it possible to observe a zone of interest lying in the field of view of the panoramic camera from a different viewpoint than that of said panoramic camera, and possibly with better resolution than said panoramic camera. Thus, the panoramic camera and the non-panoramic camera complement one another perfectly. Specifically, the panoramic camera provides an overview of a scene, while the non-panoramic camera provides a more detailed view of a pre-defined zone within this scene.

For example, in the case of a panoramic camera situated in the zone of intersection between the transverse aisle adjoining the flightdeck and the longitudinal aisle, the non-panoramic camera can be sited so that it observes a zone of interest situated at the end of the longitudinal aisle, in front of the second access door that provides access to said flightdeck. In such an instance, the panoramic camera, for example sited in the ceiling and aimed at a floor of the zone of intersection allows generalized monitoring of access to the flightdeck and makes it possible to detect the presence of an individual seeking to access the flightdeck. The non-panoramic camera can then be used to identify the individual who is seeking to access the flightdeck. The non-panoramic camera is, for example, sited in the second access door or in a bulkhead surrounding said second access door.

In preferred embodiments of the invention, the panoramic camera has a field of view that is wide enough also to observe the transverse aisle on the opposite side of said panoramic camera to the first access door and/or the longitudinal aisle on the opposite side of said panoramic camera to the second access door. The system thus has the advantage of being able to monitor the transverse aisle and/or the longitudinal aisle without needing a further camera.

In preferred embodiments of the invention, the aircraft comprises a third access door at another end of the transverse aisle, and the panoramic camera has a field of view that is wide enough also to observe said third access door. This is because an aircraft conventionally has an emergency exit located at an opposite end of the transverse aisle to the door used for accessing the passenger cabin from the outside. The system thus has the advantage of being able to monitor this third access door without requiring a further camera.

In preferred embodiments of the invention, the aircraft comprises a second longitudinal aisle intersecting with the transverse aisle at a second zone of intersection, and the surveillance system comprises another panoramic camera sited in the second zone of intersection so as to observe the second longitudinal aisle. Such a second panoramic camera advantageously makes it possible to achieve redundancy in the monitoring of the transverse aisle and of the two doors for accessing the aircraft cabin from the outside. This redundancy of data offers the advantage that individuals wishing to access the flightdeck can be viewed from several viewpoints and thus identified better.

In preferred embodiments of the invention, which may be considered alone or in combination with the preceding embodiments, the surveillance system comprises a panoramic camera located in a hold of the aircraft. Such a panoramic camera situated in the hold of the aircraft makes it possible to monitor the movement of luggage or even detect the presence of intruders or incidents that have occurred in the hold.

In preferred embodiments of the invention, which may be considered alone or in combination with the preceding embodiments, the surveillance system comprises a panoramic camera located in a landing gear bay of the aircraft. Such a panoramic camera makes it possible to monitor the operation of the landing gear or even detect the presence of intruders in the landing gear bay.

In preferred embodiments of the invention, which can be considered alone or in combination with the preceding embodiments, the surveillance system comprises a panoramic camera sited in the passenger cabin of the aircraft, i.e. in the zone of the passenger cabin in which the seats for the passengers are located.

For preference, at least one panoramic camera is housed in a ceiling of the closed space in which said camera is situated. A camera situated in the ceiling has the notable advantage of being sited in a fairly uncluttered part of the aircraft, whatever closed space of the aircraft is being considered. In that respect, the present invention proves to be far more advantageous than the devices proposed by the prior art which require installation in more cluttered locations such as the bulkheads situated over the access doors.

In preferred embodiments, at least one panoramic camera comprises a fixed camera associated with a fixed objective lens capable simultaneously of focusing the entire panoramic field of view onto the fixed camera. Such arrangements allow all of the panoramic field of view of this panoramic camera to be captured simultaneously, with each captured image representing the entirety of the panoramic field of view.

In particular embodiments, at least one panoramic camera has a field of view which is panoramic both in azimuth, about an axis of the panoramic camera, and in elevation in a plane containing said axis of the panoramic camera. In other words, the angular width of said field of view is greater than 150° both in elevation and in azimuth.

In particular embodiments, at least one panoramic camera has a field of view in azimuth with an angular width of 360° about an axis of the panoramic camera. A field of view as broad as this advantageously allows the panoramic camera or cameras of the surveillance system to observe very broad zones of interest notably associated with the access doors.

In particular embodiments, at least one panoramic camera is sensitive in the infrared wavelengths. A panoramic camera of this type advantageously allows image processing to be carried out, notably to detect fire or smoke, and thus protect the passengers or their luggage or even certain parts of the aircraft. The panoramic camera may also act as a thermographic sensor, detecting hotspots by graphics inserted over the viewed stream of images, and thus detect the presence of smoke or individuals.

In particular embodiments, at least one panoramic camera is preferably equipped with a lighting element. The image processing that can be performed by the surveillance system may involve processing operations outside the visible spectrum, for example in the infrared domain. In these wavelengths, it is particularly advantageous to associate a lighting element with one or more panoramic cameras in order to improve the processing.

In particular embodiments, at least one panoramic camera is sited inside a sealed box, which prevents certain damage to the panoramic camera that could be caused by condensation likely to form on it were such a box not to be present.

In particular embodiments, at least one panoramic camera presents little distortion, making it possible to obtain a view close to human vision while at the same time having a panoramic field of view. Thus it will be easier for the flight crew to interpret the images.

In particular embodiments, the panoramic camera further comprises a lighting element and a housing in which are arranged said lighting element and the fixed objective lens, and the fixed objective lens is arranged in a protruding part of the housing that extends forward beyond the lighting element, such that said lighting element is recessed in the housing relative to the fixed objective lens and is not in the field of view of said fixed objective lens.

In particular embodiments, the protruding part is of tubular shape and made of opaque material, and the fixed objective lens is arranged inside said protruding part of the housing.

In particular embodiments, the housing comprises a peripheral groove surrounding the protruding part and the lighting element is arranged in said peripheral groove.

In particular embodiments, the panoramic camera comprises a plurality of lighting elements arranged in the peripheral groove.

In particular embodiments, wherein the panoramic camera comprises a panomorph objective lens.

BRIEF DESCRIPTION OF THE FIGURES

The invention will be better understood from reading the following description and from examining the accompanying figures. These figures are given by way of nonlimiting illustration of the invention and show.

Elements that are identical, similar or analogous maintain the same references from one figure to the other.

DESCRIPTION OF PREFERRED EMBODIMENTS

Figure 1:
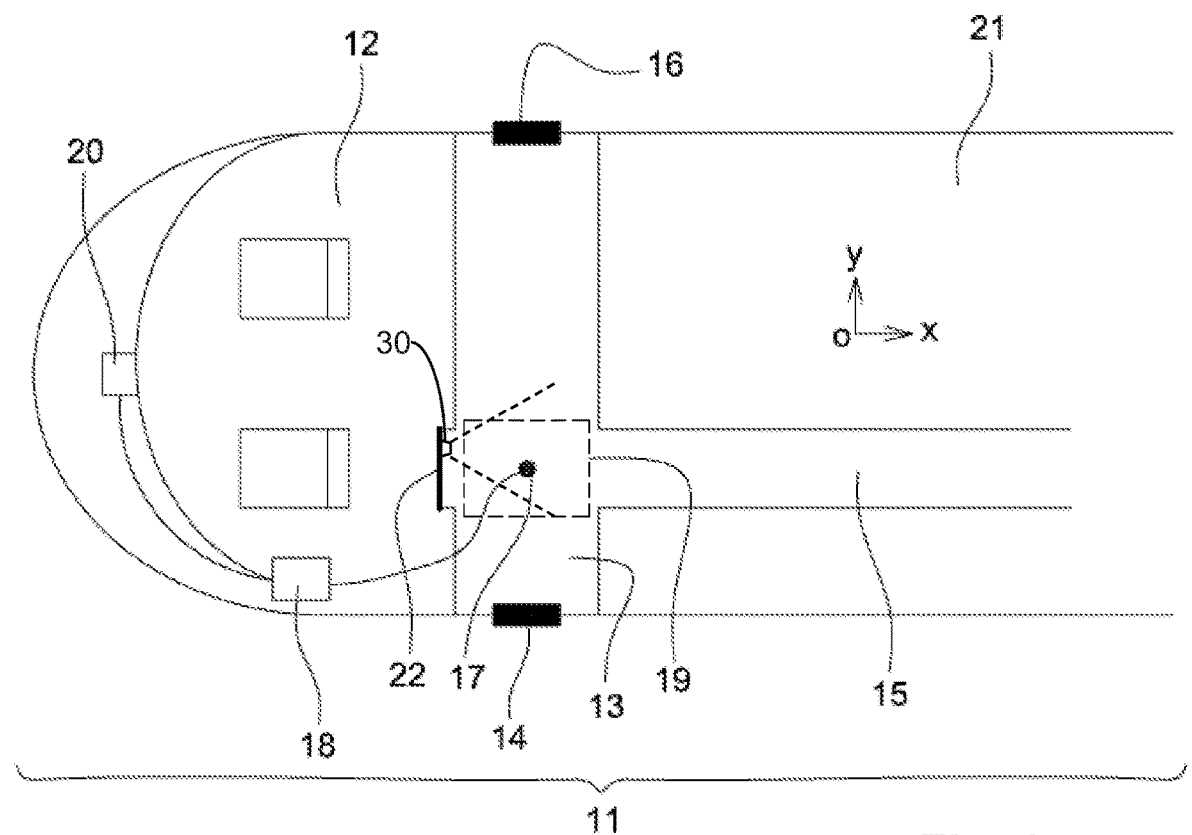
FIG. 1: a schematic representation of an aircraft of the airplane type according to one preferred embodiment of the invention.

FIG. 1 illustrates a preferred embodiment of the invention and depicts the forward part of an aircraft 11, the other parts of which have not been depicted. The aircraft comprises a main cabin 21, intended notably to accommodate passengers, and a flightdeck 12, separated from the main cabin by an access door 22.

For the purposes of the description, a frame of reference comprising three axes x, y, z is associated with the aircraft 11. The axis x is a longitudinal axis of the aircraft 11. The axis y is an axis orthogonal to the axis x, forming with the axis x a plane substantially parallel to a floor of the aircraft 11. The axis z (not indicated in the figures) is orthogonal to the axis x and to the axis y and is therefore substantially orthogonal to the floor of the aircraft 11.

A lateral access door 14 provides access to the cabin of the aircraft 11 from outside. It opens onto a transverse aisle 13 running substantially along the axis y, adjoining the flightdeck 12.

In this embodiment, the transverse aisle 13 services, on one side, a longitudinal aisle 15 that runs substantially along the longitudinal axis x, and, on the other side, the access door 22 providing access to the flightdeck 12. A third door 16 which acts as an emergency exit is also present at one end of the transverse aisle 13 which is the opposite end to the lateral access door 14.

To protect access to the flightdeck 12, the access door 22 generally involves security measures, for example is reinforced.

The aircraft 11 further comprises a surveillance system.

This surveillance system comprises a camera having a panoramic field of view and is referred to as "panoramic camera" 17.

A "panoramic camera" means a camera that has a field of view with an angular width in excess of 150°, preferably in excess of 240°.

The panoramic camera 17 is used to observe a zone of interest associated with the access door 22 providing access to the flightdeck 12 and a zone of interest associated with the lateral access door 14.

The panoramic camera 17 is, for example, connected to a computer 18 able to process a stream of images originating from the camera in order to display it on at least one display screen 20. There is nothing to preclude, in other examples and if the stream of images does not need to be processed, connecting the panoramic camera 17 directly to the display screen 20, without passing via a computer 18.

Figure 2:
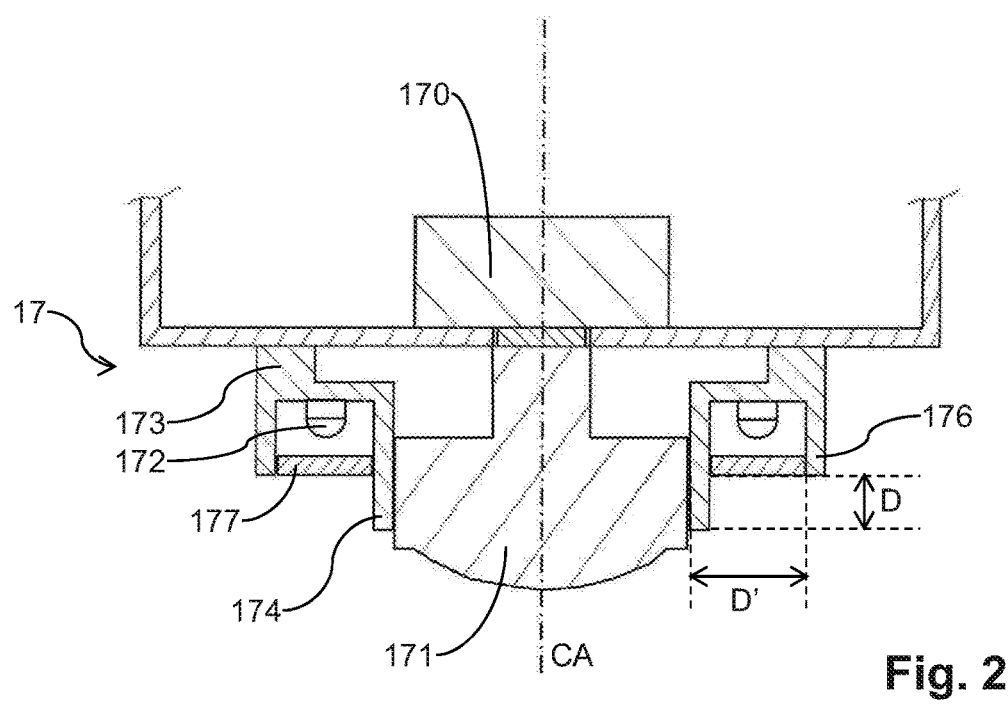
FIG. 2: a cross section schematic representation of a preferred embodiment of a panoramic camera to be used in an aircraft.

In the examples given in FIGS. 1 and 2, the display screen 20 is in the flightdeck 12. There is nothing to preclude, according to other examples, having the display screen 20 situated elsewhere in the aircraft 11 than in the flightdeck. Further, if the surveillance system comprises several display screens, these may be situated at various points within the aircraft 11.

The panoramic camera 17 may be a camera capable of rotating about a fixed axis, or alternatively may comprise a fixed (immobile) camera associated with a mirror system capable of rotating. In such cases, the panoramic field of view is observed by rotating the mobile camera and/or the mobile mirror system and by capturing successive images each representing part of the panoramic field of view.

For preference, the panoramic camera comprises a fixed camera associated with a fixed objective lens able to focus simultaneously all of the panoramic field of view and comprising diffractive, refractive optical elements, optical elements involving concave and/or convex mirrors, involving half-silvered mirrors, etc. In such instances it is possible simultaneously to capture all of the panoramic field of view of the panoramic camera 17 and each captured image then represents all of the panoramic field of view. By way of example, use may be made within the context of the present invention of a camera as described in Patent Application FR-A-2 902 592. Thus, all the elements that make up the panoramic camera 17 are preferably immobile, and said panoramic camera 17 does not need to comprise mechanical and electrical means for driving the camera or its objective lens, which drive means are often bulky and require regular maintenance.

In preferred embodiments, the panoramic camera 17 has a fixed camera associated with a fixed panomorph objective lens able to focus simultaneously all of the panoramic field of view. Examples of suitable panomorph objective lenses are commercialized, inter alia, by ImmerVision®. Panomorph objective lenses are particularly advantageous for surveillance systems since they allow for spatially differentiated resolution in the field of view of the panoramic camera 17. In other words, the pixel density is not necessarily the same in every direction in the field of view, and it is possible e.g. to have a high number of pixels per steradian in the direction of a zone of interest having a high priority, and to have a low number of pixels per steradian in the direction of a zone of interest having a low priority. Spatially differentiated resolution is not possible with e.g. fisheye objective lenses.

In the nonlimiting example of FIG. 1, the zone of interest associated with an access door 14, 22 corresponds to said access door, and to a zone situated in the cabin in front of and around this door.

According to the invention, the panoramic camera 17 is sited in the cabin 21 in such a way that the zones of interest associated with each of the access doors 14 and 22 lie in its field of view.

In the embodiment depicted in FIG. 1, the panoramic camera 17 preferably has a panoramic field of view about an axis of the camera, referred to as "camera axis" that is substantially parallel to the axis z (the axis z being orthogonal to the axes x and y). In other words, the field of view of the panoramic camera 17 is of an angular width greater than 150° about the camera axis (in azimuth). For preference, the width of the field of view of the panoramic camera 17 about this axis is substantially equal to 360°.

The panoramic camera 17 may advantageously be placed in the ceiling, which is generally fairly uncluttered. In that respect, the present invention proves to be far more advantageous than the devices proposed by the prior art, which require installation in more cluttered areas such as the bulkheads over the access doors.

For preference, the panoramic camera 17 makes it possible to obtain a panoramic field of view not only about the camera axis (in azimuth) but also with respect to the camera axis in a plane containing said camera axis (in elevation). Specifically, such a panoramic camera makes it possible to look in numerous directions in azimuth and in elevation. For example, if a panoramic camera 17 has a panoramic field of view of an angular width of substantially 360° in azimuth, and substantially 180° in elevation, such a panoramic camera will make it possible to observe a solid angle of around $2\pi$ steradians, namely a substantially hemispherical field of view.

The panoramic camera example given in Patent Application FR-A-2 902 592 makes it possible to have a field of view of an angular width of substantially 360° in azimuth and almost 150° in elevation. For preference, the panoramic camera 17 is situated in a zone of intersection 19 between the transverse aisle 13 and the longitudinal aisle 15, as depicted in FIG. 1.

Further, if the field of view of the panoramic camera 17 is wide enough (which it is if the width of the field of view is equal to 360° in azimuth), arranging the panoramic camera 17 in this way will allow it also to observe a zone of interest associated with the emergency exit 16 of the aircraft 11.

In the case of a panoramic camera 17 that has a panoramic field of view also in elevation (like the camera described in Patent Application FR-A-2 902 592), positioning the panoramic camera 17 here, in the ceiling, at the zone of intersection 19 and pointing toward a floor of said zone of intersection allows it also to observe said zone of intersection.

A panoramic camera 17 having a panomorph objective lens can even have a field of view of an angular width of substantially 360° in azimuth and more than 180° in elevation (up to around 250° in elevation). Considering a panoramic camera 17 with a panomorph objective lens in the embodiment depicted in FIG. 1, the panomorph objective lens is preferably arranged such that, in elevation, the pixel density decreases towards the camera axis. In other words, the pixel density is lower for directions close to the camera axis than for directions far from the camera axis. For instance, considering a field of view having an angular width of 180° in elevation and assuming that the camera axis corresponds to an angle of 0° in elevation (such that the field of view in elevation corresponds to angles in the interval [−90°, 90°]) then the pixel density is preferably lower for elevation angles having an absolute value lower than a positive value $\theta 1$ (for instance equal to) 20° than the pixel density for elevation angles having an absolute value higher than $\theta 1$ and e.g. lower than a positive value $\theta 2$ ($\theta 2$ being higher than $\theta 1$, for instance equal to 60°). Indeed, with the arrangement depicted in FIG. 1, where the panoramic camera 17 is situated in the ceiling and directed downwards, then the pixels in the direction of the camera axis will show mainly, in the context of a CDSS, the top of the head of an individual willing to enter the flightdeck 12. Accordingly, these pixels cannot be used for identification purposes and it is not possible for an individual to hide in the direction of the camera axis. Hence these pixels carry little information for the flight crew, and it is advantageous to increase the pixel density in other directions, in order to have e.g. a higher resolution in zones where an individual might try to hide himself.

This system according to the invention allows a great reduction in the need for cameras in surveillance systems. This objective is achieved not only by means of a single panoramic camera 17 but also by completely modifying the conventional layout of the cameras in current surveillance systems. This then directly reduces the number of cameras and the number of connectors needed to operate them, and the wiring requirements. In addition, when a panoramic camera has a field of view and a location such as those recommended by the invention, the surveillance system has few if any blind spots: it allows images of all the zones situated near the sighted access doors to be captured simultaneously.

In addition, the entirety of the field of view of the panoramic camera 17 may advantageously be displayed to the flight crew (and/or to the cabin crew) in the form of a single image. In that way, the flight crew has instant access to information relating to several zones of interest associated with various access doors of the aircraft 11 where, according to the prior art, they had to examine in turn each of the images supplied by each of the cameras.

In one particular embodiment, also illustrated in FIG. 1, the surveillance system comprises a camera that has a non-panoramic field of view (i.e. an angular width of 150° or less), referred to as a "non-panoramic camera" 30.

The non-panoramic camera 30 is sited in such a way as to observe a zone of interest lying in the field of view of the panoramic camera 17. More specifically, the non-panoramic camera 30 is positioned in such a way as to observe a zone of interest lying in front of the door 22 that provides access to the flightdeck 12. For that reason, the non-panoramic camera 30 is, in this example, sited in the access door 22 that provides access to the flightdeck 12, so as to observe the longitudinal aisle 15.

The non-panoramic camera 30 is, for example, used to identify an individual standing in front of the door 22 and seeking to access the flightdeck 12. Thus, the panoramic camera 17 is able to provide surveillance over access to the door 22 to the flightdeck 12, and detect whether somebody is seeking to enter said flightdeck 12. This detection is, for example, performed by the flight crew or automatically by processing the images supplied by the panoramic camera 17. The non-panoramic camera 30, which could be activated only when it has detected that an individual is seeking to enter the flightdeck 12, then allows the face of this individual to be observed and make it easier for his face to be recognized either by the flight crew or automatically by the processing of the images supplied by said non-panoramic camera 30.

There is nothing to preclude, according to other examples, replacing the non-panoramic camera 30 with another panoramic camera, provided that it is sited in such a way as to be able to observe part of a field of view of the panoramic camera 17 from a different viewpoint than that of said panoramic camera 17.

FIG. 2 represents a preferred embodiment of panoramic camera 17, in which said panoramic camera 17 comprises one or several lighting elements 172.

For a panoramic camera 17 used in a CDSS, arranged e.g. as illustrated in FIG. 1, the panoramic camera 17 is preferably sensitive in visible wavelengths and each lighting element 172, such as an LED, emits a visible light, i.e. in visible wavelengths. Providing the panoramic camera 17 with such lighting element(s) 172 is advantageous in a CDSS since it allows for surveillance even in low light conditions, e.g. when lights of the cabin 21 are switched off during e.g. landing of the aircraft at night. The lighting elements 172 may be controlled from the flightdeck (e.g., On/Off, intensity.)

As illustrated in FIG. 2, the panoramic camera 17 comprises a fixed camera 170 and a fixed objective lens 171. The panoramic camera 17 further comprises a housing 173, represented alone in FIG. 3, in which are located:
 the lighting element(s) 172; and
 the fixed objective lens 171 able to focus simultaneously all the panoramic field of view of the panoramic camera 17.

Figure 3:
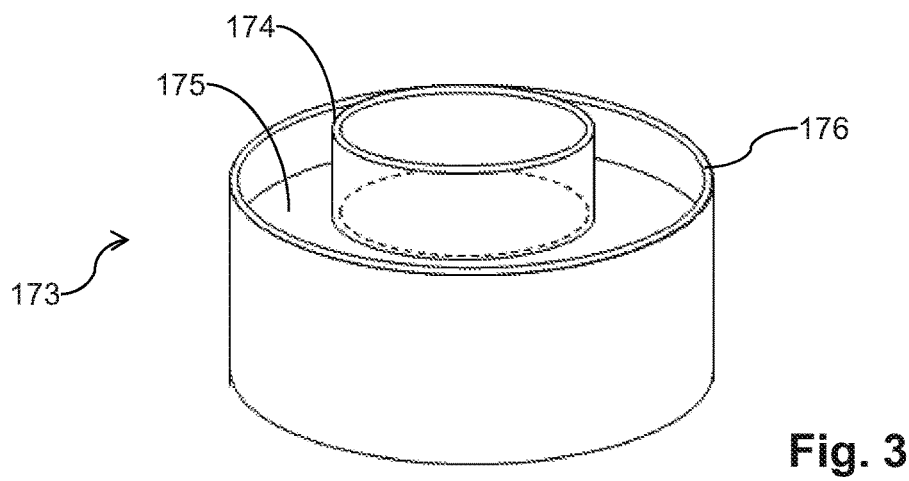
FIG. 3: a schematic perspective view of a housing of the panoramic camera of FIG. 2.

In the non limitative example illustrated by FIG. 3 the housing 173 is made of a single piece. It should be noted that the housing 173 can also be made, in other examples, of an assembly of several pieces.

The fixed objective lens 171 is preferably a panomorph objective lens, configured for instance such that the pixel density decreases towards the camera axis CA, as explained hereinabove.

As illustrated in FIG. 2, the fixed objective lens 171 and the lighting elements 172 are preferably arranged in the housing 173 such that the lighting elements 172 are not in the field of view of the fixed objective lens 171. More specifically, the fixed objective lens 171 is preferably arranged in a protruding part 174 of the housing 173, said protruding part 174 extending forward (i.e. towards a scene observed by the panoramic camera 17) beyond the lighting element(s) 174, such that each lighting element 172 is recessed in the housing relative to the fixed objective lens 171, with respect to the observed scene. Such an arrangement ensures that light emitted by lighting elements 172 is not received directly by the fixed objective lens 171, which would blind the panoramic camera 17.

The protruding part 174 extends substantially along the camera axis CA, towards the floor of the aircraft 11, from a first end integral with a base 175 of the housing 173 and towards a second end comprising an opening through which emerges the fixed objective lens 171. Each lighting element 172 is arranged toward the base 175 of the housing 173. The protruding part 174 is for instance of tubular shape with a circular cross section, and the fixed objective lens 171 is arranged inside the protruding part 174, as illustrated in FIGS. 2 and 3. Preferably, the protruding part 174 is made of an opaque material, such as metal or plastic, in order to prevent the light emitted by the lighting element 172 from being received by the sides of the fixed objective lens 171 and protruding part 174.

In the embodiment depicted in FIGS. 2 and 3, the housing 173 comprises a peripheral wall 176, extending towards the floor of the aircraft 11, from a first end integral with the base 175 and towards a second end opposed to the first end. The peripheral wall 176 surrounds the protruding part 174, and has a height that is smaller than the height of the protruding part 174, such that the protruding part 174 extends beyond the peripheral wall 176 by a height D that is, for example, higher than or equal to 5 millimeters. The height D may be defined in relation to a width D' of a light scattering element 177 defined below, wherein a ratio D/D' is higher than 0.25 and preferably more than 0.4. The peripheral wall 176, the base 175 and the protruding part 174 thus create a peripheral groove surrounding said protruding part 174. The lighting elements 172 are located in said peripheral groove, preferably arranged in a regular manner around the protruding part 174, i.e. regularly spaced in the peripheral groove.

In preferred embodiments, and as illustrated in FIG. 2, the panoramic camera 17 further comprises a light scattering element 177 arranged in front of the lighting element(s) 172. The light scattering element 177 is for instance made of translucent material that scatters the light emitted by the lighting element(s) 172, such that the illumination of the scene observed by the panoramic camera 17 is substantially homogeneous. The light scattering element 177 is for instance of annular shape, and surrounds the protruding part 174 at the level of the second end of the peripheral wall 176 of the housing 173.

Figure 4:
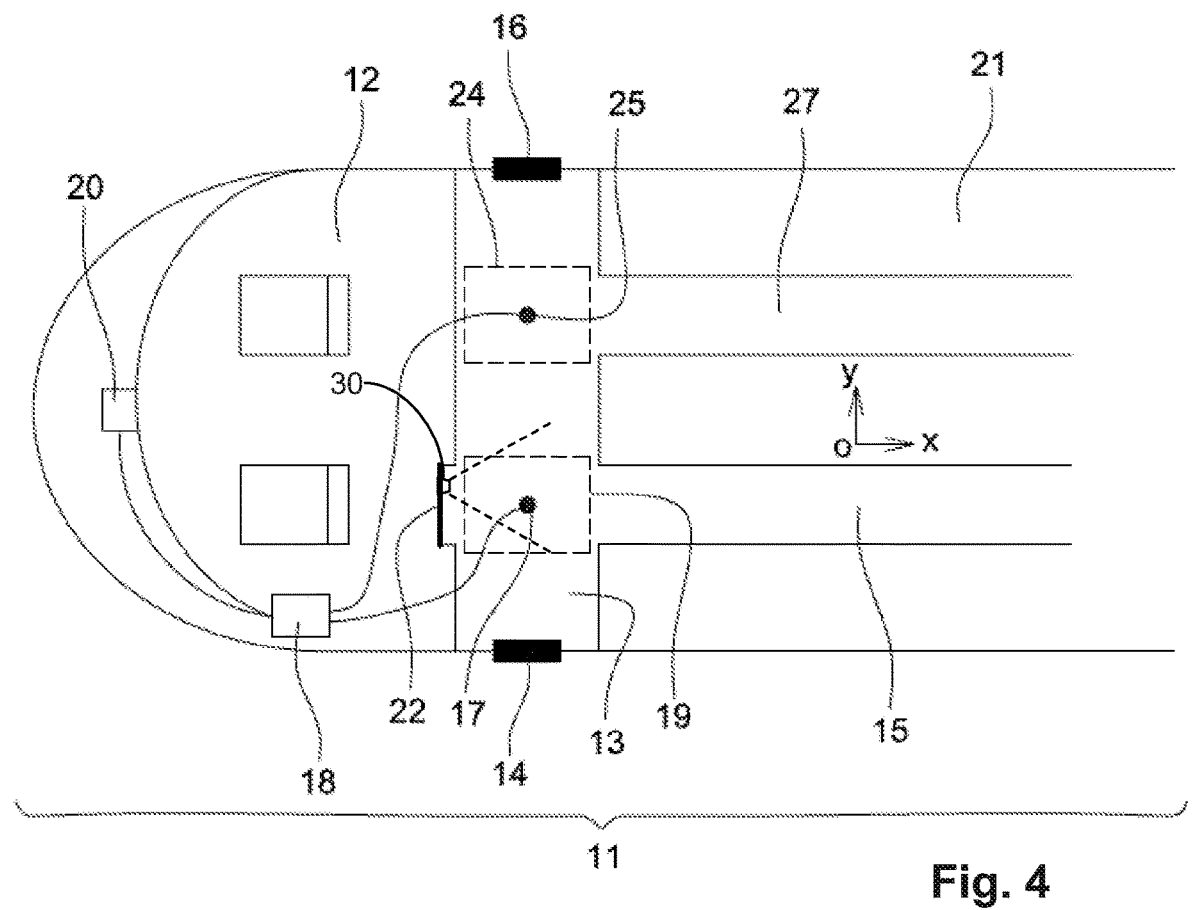
FIG. 4: a schematic representation of an aircraft of the type according to a second preferred embodiment of the invention.

FIG. 4 depicts another preferred embodiment, in the case of an aircraft 11 of the airplane type with a different layout from that of FIG. 1. This aircraft comprises the same constituent elements as the one described hereinabove with reference to FIG. 1, but with the addition of a second longitudinal aisle 27 in the cabin 21 of the aircraft 11. The second longitudinal aisle 27 intersects the transverse aisle 13 in a second zone of intersection 24.

In the embodiment illustrated in FIG. 4, the surveillance system comprises a second panoramic camera 25, preferably situated in this second zone of intersection 24 and in a position that allows it to capture an image at least of the second longitudinal aisle 27.

In instances in which the second panoramic camera 25 has a panoramic field of view both about an axis substantially parallel to the axis z (in azimuth) and in a plane substantially parallel to the axis z, on each side of this axis (in elevation), said second panoramic camera can be arranged in such a way as to capture an image representing also, at least in part:
- the zone of interest associated with the door 14 providing access to the cabin 21 of the aircraft 11,
- the zone of interest associated with the emergency exit 16 of the aircraft 11, and
- the second zone of intersection 24.

The use of a second panoramic camera 25 positioned in the second zone of intersection 24 thus provides redundancy in the monitoring of the transverse aisle 13, of the door 14 providing access to the cabin 21 of the aircraft 11, and of the emergency exit 16 of the aircraft 11. This redundancy in the data between the two panoramic cameras of the embodiment of the invention that forms the subject matter of FIG. 4, advantageously allows individuals wishing to access the flightdeck 12 to be seen from various viewpoints, and thus to identify them better.

In one particular embodiment, the surveillance system comprises a panoramic camera situated in a hold of the aircraft 11, which has not been depicted in the figures, preferably of the type comprising a fixed camera associated with a fixed objective lens able to focus the entirety of the panoramic field of view.

The use of a panoramic camera in the hold of the aircraft 11 allows several zones of interest, of which one is for example associated with a door providing access to the hold, to be under surveillance using a reduced number of cameras. As described earlier, installing a panoramic camera in the hold makes it possible to reduce the need for cameras, and therefore also the need for connections and maintenance.

For preference, the panoramic camera in the hold is housed in a ceiling of this hold. Advantageously, the panoramic camera is placed substantially in the middle of the ceiling of said hold. Such a positioning of the panoramic camera makes it possible, when the camera has a field of view of an angular width of 360°, to observe all the walls of the hold using just one camera.

In one particular embodiment, the surveillance system comprises a panoramic camera situated in a landing gear bay of the aircraft 11, which is not depicted in the figures, preferably of the type comprising a fixed camera associated with a fixed objective lens able to focus the entirety of the panoramic field of view.

In one particular embodiment, the surveillance system comprises a panoramic camera situated in a passenger cabin of the aircraft 11, which is not depicted in the figures, preferably of the type comprising a fixed camera associated with a fixed objective lens able to focus the entirety of the panoramic field of view.

The surveillance system for example comprises at least one panoramic camera that is sensitive in a visible waveband (i.e. a band containing wavelengths of between 0.4 micrometers and 0.7 micrometers) and/or in an infrared waveband (which means wavelengths of between 0.7 micrometers and 100 micrometers). In the case of a panoramic camera that is sensitive in an infrared waveband, said panoramic camera is preferably sensitive in one of the following wavebands:
- wavelengths from 0.7 to 3 micrometers (band I),
- wavelengths from 3 to 5 micrometers (band II), and
- wavelengths from 8 to 14 micrometers (band III).

In instances in which the surveillance system comprises several panoramic cameras, these are sensitive in one and the same waveband or in different wavebands.

Advantageously, a lighting element may be associated with one or more of the panoramic cameras. For example, in the case of the hold of the aircraft 11, the use of a thermal panoramic camera associated with an infrared lighting element provides better visibility particularly if there is smoke in the hold.

It will be appreciated that the use of a panoramic camera in a surveillance system for the surveillance of a closed space of an aircraft offers numerous advantages. It should be noted that there are numerous positions at which a panoramic camera can be installed in a closed space of an aircraft and that the invention is not limited to the positions described notably with reference to FIGS. 1 and 2, although these do illustrate embodiments which are considered to be particularly advantageous.

More generally, a surveillance system according to the invention comprises at least one panoramic camera which can be sited in any closed space of the aircraft (flightdeck, passenger cabin, hold, landing gear bay, passenger cabin, etc.) so as to make it possible to observe at least one zone of interest within this closed space. In instances in which the surveillance system comprises several panoramic cameras, these may all be sited in one and the same closed space of the aircraft, at different locations within this closed space, or spread among different enclosed spaces of the aircraft.

The invention claimed is:

1. An aircraft comprising:
a flightdeck;
a main cabin comprising a transverse aisle and a longitudinal aisle, the longitudinal aisle running along a longitudinal axis of the aircraft,
the main cabin further comprising an intersection zone at which the transverse aisle and the longitudinal aisle intersect, a first access door that is situated at one end of the transverse aisle, and a second access door that is situated at one end of the longitudinal aisle,
said second access door providing access from the main cabin to the flightdeck; and
a cockpit door surveillance system (CDSS) arranged to monitor said second access door;
wherein the CDSS comprises a panoramic camera comprising a fixed, immobile camera associated with a fixed objective lens configured to focus simultaneously a field of view with an angular width in excess of 150° both in azimuth about an axis of the panoramic camera and in elevation in a plane containing said axis of the panoramic camera;
wherein said panoramic camera is in a region of the intersection zone and arranged so that a zone of interest associated with the first access door and a zone of interest associated with the second access door are in the field of view of said panoramic camera;
wherein said panoramic camera further comprises a housing and a lighting element, said lighting element being arranged in said housing, the housing including a protruding part that extends forward beyond the lighting element; and
wherein the fixed objective lens is arranged in the protruding part of the housing that extends forward beyond the lighting element, such that said lighting element is recessed in the housing relative to the fixed objective lens and is not in the field of view of said fixed objective lens,
wherein the panoramic camera further comprises a light scattering element arranged in front of the lighting element and recessed in the housing relative to the fixed objective lens, and wherein the light scattering element is surrounded by a peripheral wall which is recessed relative to the protruding part by a height D and wherein light scattering element has a width D', and wherein a ratio D/D' is greater than 0.25.

2. The aircraft as claimed in claim 1, wherein the protruding part is of tubular shape and made of opaque material, and the fixed objective lens is arranged inside said protruding part of the housing, the protruding part extending forward beyond the lighting element sufficient to prevent light emitted by the lighting element from being received by sides of the fixed objective lens and preventing the light emitted by lighting element from being received directly by the fixed objective lens.

3. The aircraft as claimed in claim 2, wherein the housing comprises a peripheral groove surrounding the protruding part and the lighting element is arranged in said peripheral groove.

4. The aircraft as claimed in claim 3, wherein the lighting element comprises plural light emitting elements in the peripheral groove.

5. The aircraft as claimed in claim 4, wherein the fixed objective lens is a panomorph objective lens.

6. The aircraft as claimed in claim 5, wherein the panomorph objective lens is configured such that a pixel density of the panoramic camera decreases towards the axis of said panoramic camera.

7. The aircraft as claimed in claim 1, wherein said CDSS further comprises a non-panoramic camera having a field of view with an angular width less than 150°, said non-panoramic camera being separate from the panoramic camera and said non-panoramic camera being arranged to observe a zone of interest in the field of view of the panoramic camera.

8. The aircraft as claimed in claim 7, wherein said non-panoramic camera is arranged to observe a zone of interest at the end of the longitudinal aisle, in front of the second access door.

9. The aircraft as claimed in claim 8, wherein said non-panoramic camera is sited in the second access door.

10. The aircraft as claimed in claim 1, wherein said panoramic camera has a field of view wide enough to observe also the transverse aisle on the opposite side to the first access door and/or the longitudinal aisle on the opposite side to the second access door.

11. The aircraft as claimed in claim 1, further comprising a third access door at another end of the transverse aisle, wherein the field of view of the panoramic camera has an angular width to observe the third access door so that the zones of interest associated with the first and second access doors a zone of interest associated with the third access door are simultaneously captured in an image by said panoramic camera.

12. The aircraft as claimed in claim 1, wherein the main cabin further comprises a second longitudinal aisle intersecting the transverse aisle at a second intersection zone, wherein the CDSS further comprises another panoramic camera having a field of view with an angular width in excess of 150° arranged in a region of the second intersection zone so as to observe at least the second longitudinal aisle.

13. The aircraft as claimed in claim 1, wherein said panoramic camera is housed in a ceiling of the main cabin.

14. The aircraft as claimed in claim 1, wherein the fixed objective lens is a panomorph objective lens.

15. The aircraft as claimed in claim 14, wherein the panomorph objective lens is configured such that a pixel density of the panoramic camera decreases towards the axis of said panoramic camera.

16. The aircraft as claimed in claim 1, wherein the protruding part extends forward beyond the lighting element sufficient to prevent light emitted by the lighting element from being received by sides of the fixed objective lens.

* * * * *